Jan. 15, 1929.  1,699,382
H. M. SUTTON ET AL
PROCESS AND APPARATUS FOR THE DRY SEPARATION OF MASSES OF MATERIALS
Filed Dec. 17, 1925  7 Sheets-Sheet 1
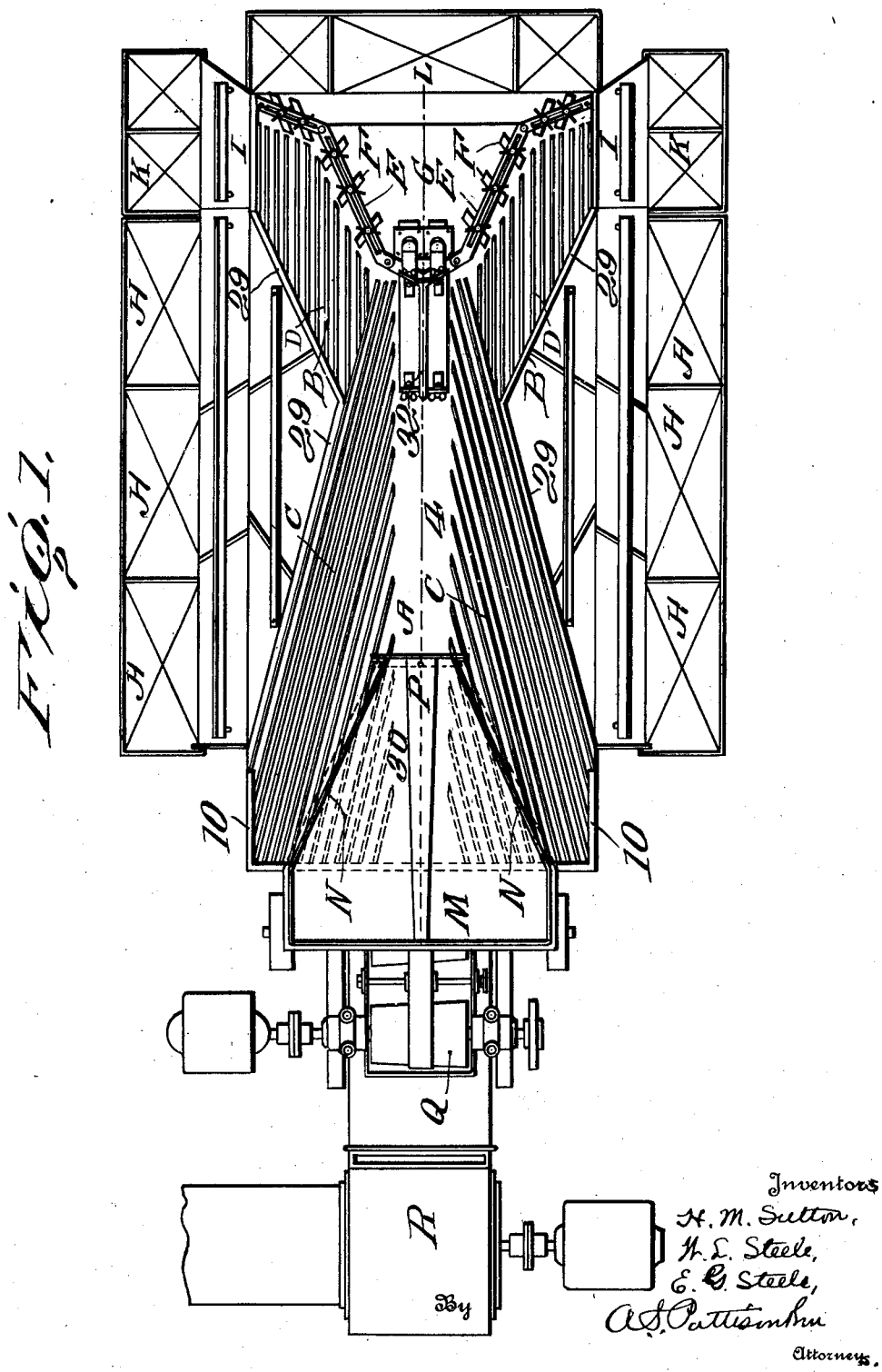

Jan. 15, 1929.　　　　　　　　　　　　　　　　　　　　　1,699,382
H. M. SUTTON ET AL
PROCESS AND APPARATUS FOR THE DRY SEPARATION OF MASSES OF MATERIALS
Filed Dec. 17, 1925　　　　　7 Sheets-Sheet 2
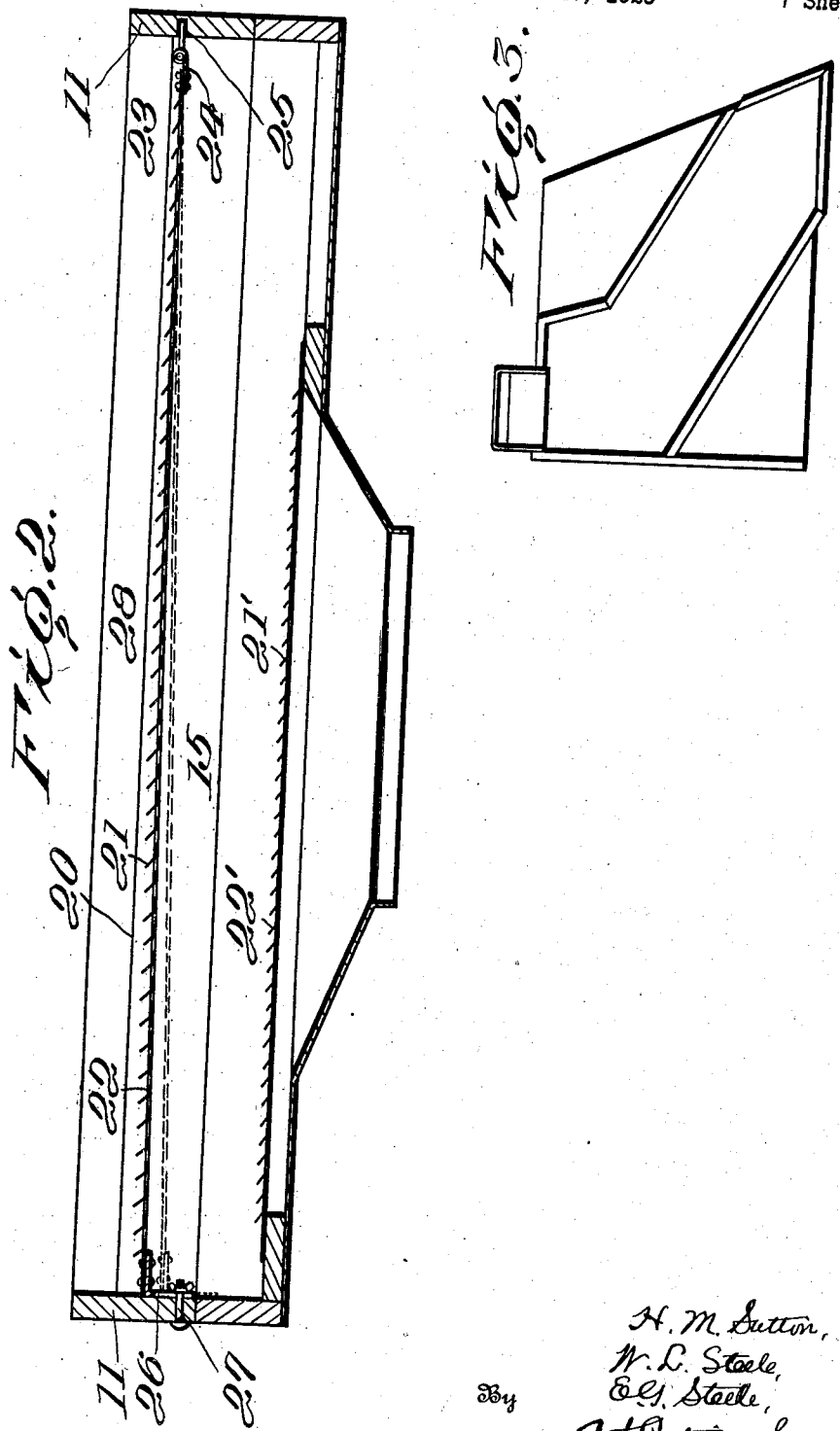

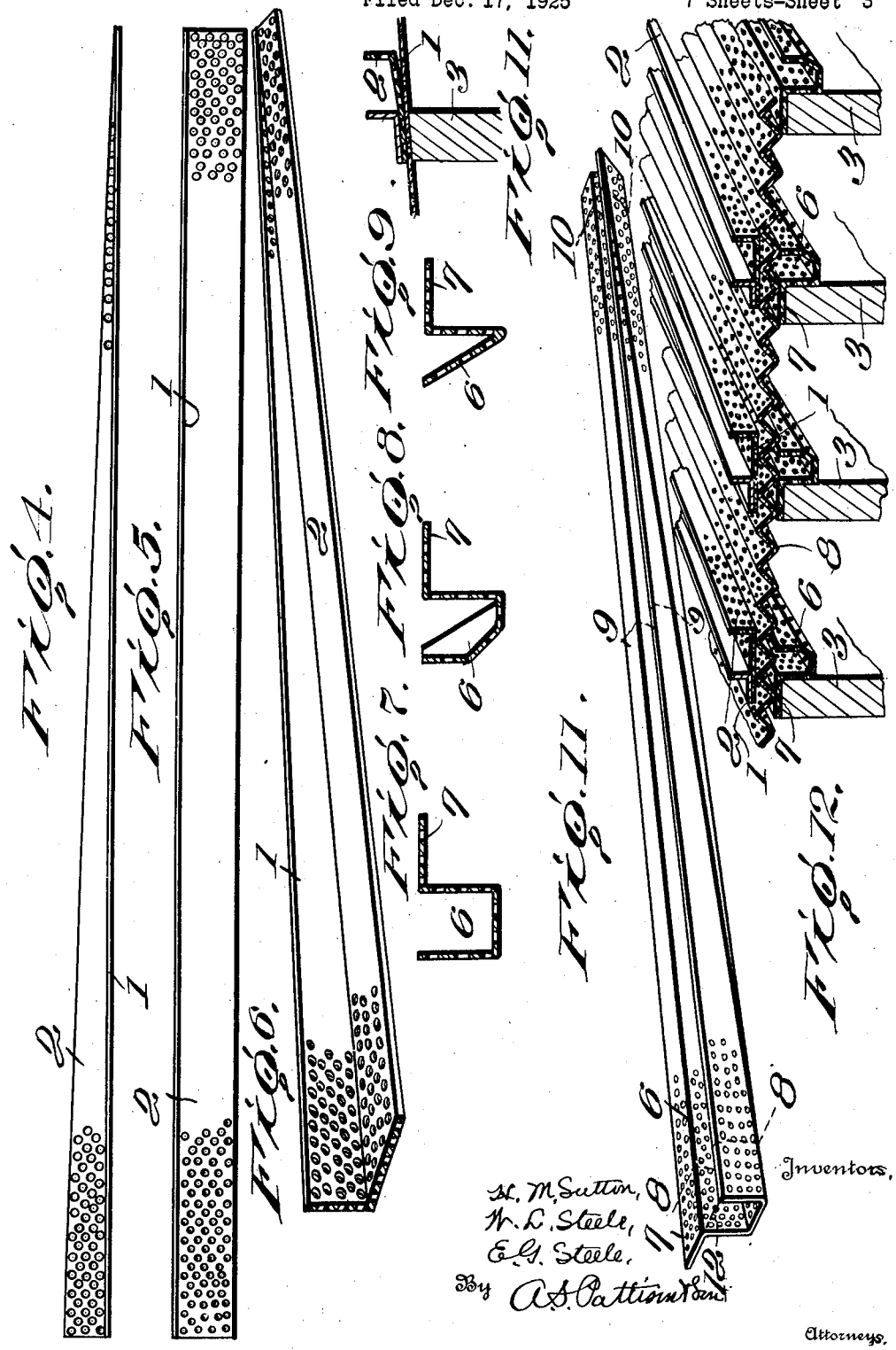

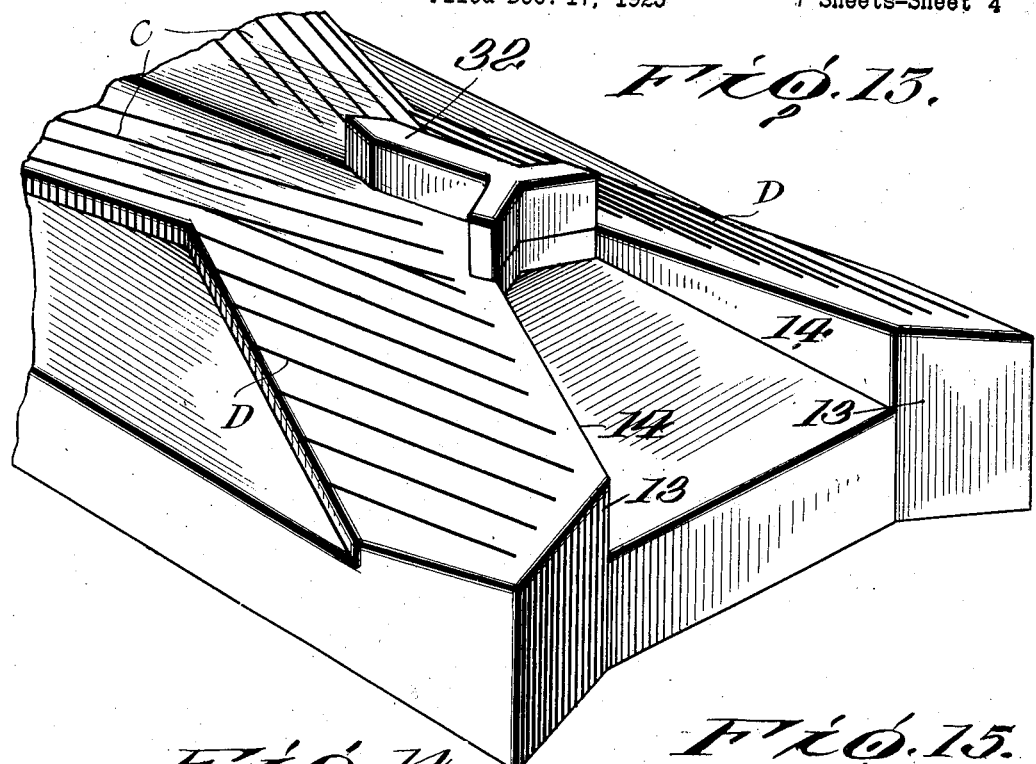
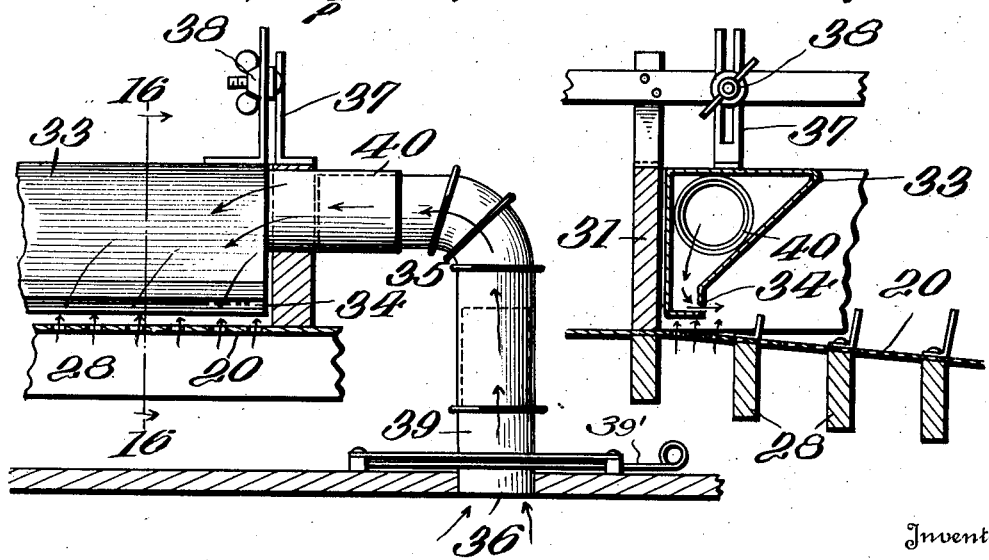

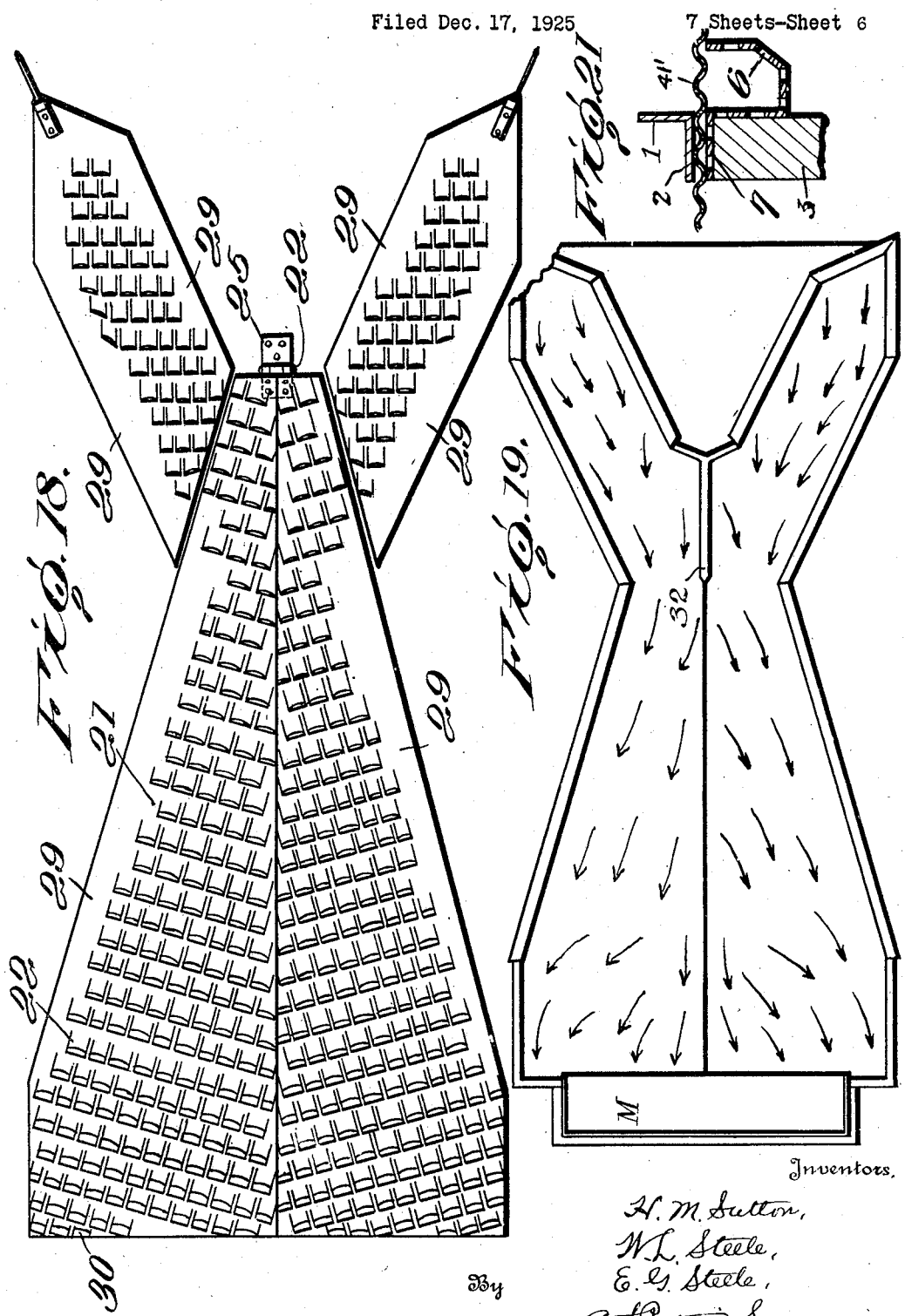

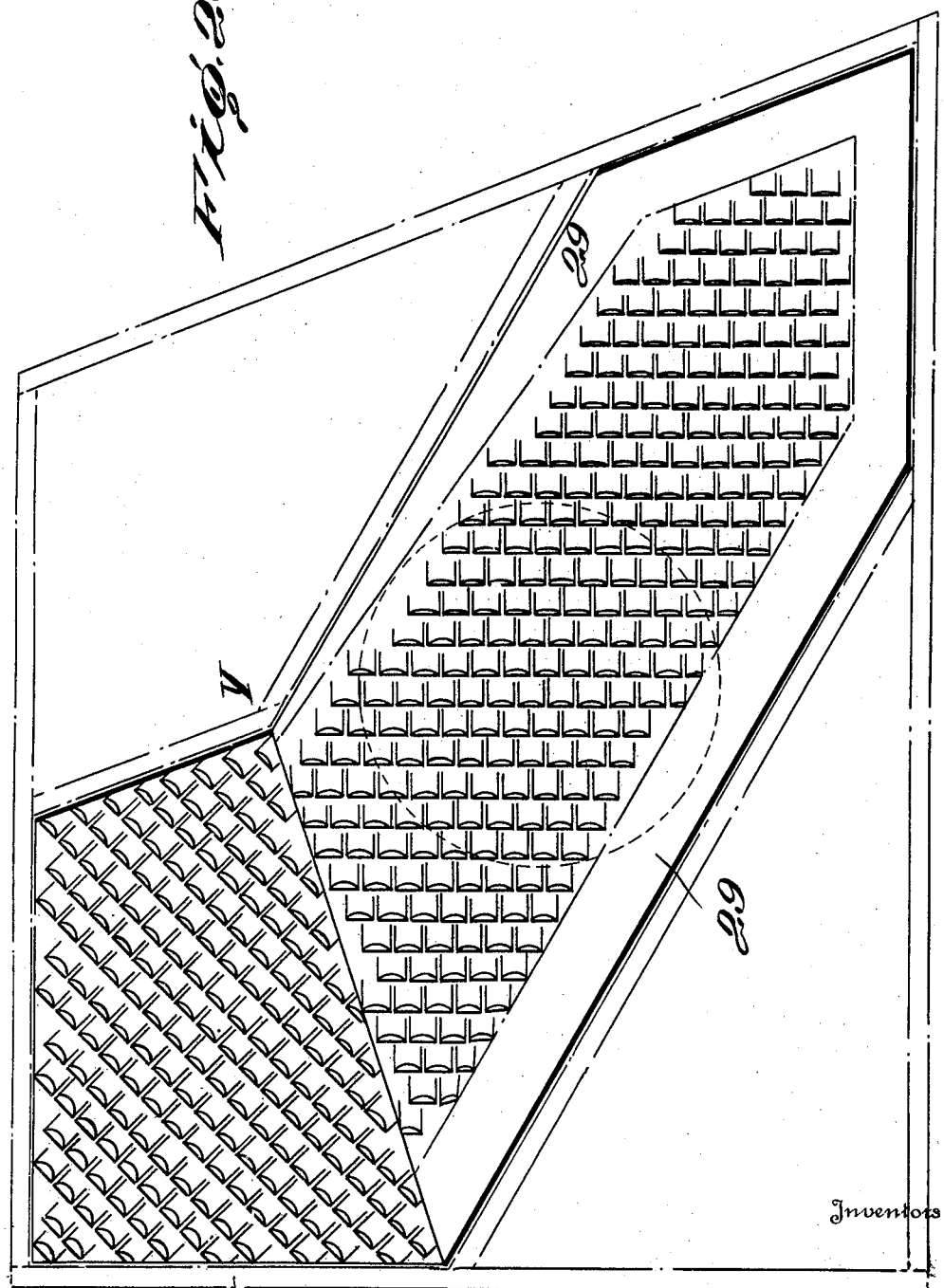

Patented Jan. 15, 1929.

1,699,382

UNITED STATES PATENT OFFICE.

HENRY MOORE SUTTON, WALTER LIVINGSTON STEELE, AND EDWIN GOODWIN STEELE, OF DALLAS, TEXAS.

PROCESS AND APPARATUS FOR THE DRY SEPARATION OF MASSES OF MATERIALS.

Application filed December 17, 1925. Serial No. 75,983.

This invention relates to improvements in process and apparatus for the dry separation of masses of materials and the present improvements are adapted to be applied generally to dry separation of materials, and particularly to the form of apparatus shown in our copending application No. 530,357 filed January 19, 1922, the said application showing a separating apparatus of substantially a Y-shape in plan view.

These improvements are adapted for use in separating masses of substantially all kinds of materials and particularly for the use of dry separation of masses of coal.

The type of dry separation to which the improvements pertain is that class of apparatus which utilizes air that flows through a pervious deck, the air floating the material, and one improvement deals with controlling the flow of air through the pervious deck, whereby the separation of the materials is not interrupted, and is in proper proportions to effect proper separation.

Another improvement relates to the particular shape of the end or ends of the arms of the Y, which effects the separation of the small pieces of slate from the coal, in a manner to be described hereinafter.

Another improvement is controlling the air within the air chamber which is located under the pervious deck, whereby the air fed to the deck is modified and controlled, and caused to act through the deck surface with increasing air pressure in direct proportion to the thickness of the bed of material located on top of the deck.

Another improvement of the present invention is to deliver a cross draught of air on the material being separated, the draught of air being so delivered that downward pressure on the material is prevented, the said draught of air being delivered at an angle to the reciprocation of the table as the material approaches the banking zone, as will be described hereinafter.

Another improvement pertains to roughening the deck surface in a new and improved manner as will appear from the description in the following specification.

Other improvements are embodied in the present invention as will be made clear in the description.

In the accompanying drawings:

Figure 1 is a top plan view of an apparatus to which the improvements are particularly adapted to be applied.

Fig. 2 is a vertical central sectional view through the deck frame showing the baffle plates located below the deck and within the air chamber, the said plates controlling the flow of air to the deck above.

Fig. 3 is another form to which the improvements are adapted to be applied.

Fig. 4 is an edge view of one of the air controlling members adapted to be applied to the top of the deck.

Fig. 5 is a top plan view of the controlling member shown in Fig. 4.

Fig. 6 is a perspective view of the controlling member of Figures 4 and 5.

Figs. 7, 8 and 9 are cross sectional views taken at different points of Fig. 11 throughout the length of the air controlling member located immediately beneath the separating deck.

Fig. 10 is a cross sectional view of the controlling members that are located on top of the separating deck, the same being shown in exaggerated form for the purpose of illustrating the turned-up ends.

Fig. 11 is a detached perspective view of the air controlling members shown in Figs. 8, 9 and 10.

Fig. 12 is a sectional perspective view showing an improved deck surface, the same also showing the combined baffles and air controls located on top of the deck, and the air controlling members located beneath the deck.

Fig. 13 is a perspective view showing in reduced form the raised ends of the Y-shaped table.

Fig. 14 is a separated view showing a portion of the skimmers for delivering a cross draught to the top of the material being separated.

Fig. 15 is a cross sectional view of Fig. 14.

Fig. 18 is a top plan view showing the baffle plate applied in the air chamber of the Y-shaped table.

Fig. 19 is a top plan view of a Y-table showing the direction of air draughts caused by the baffle plates located in the deck frame and substantially immediately below it.

Fig. 20 is a top plan view of a portion of a deck showing the imperforate portion of the baffle plates.

Fig. 21 is a sectional view showing the air retarding strip below the deck and which is used with the perforated metal deck covering.

Figure 16:
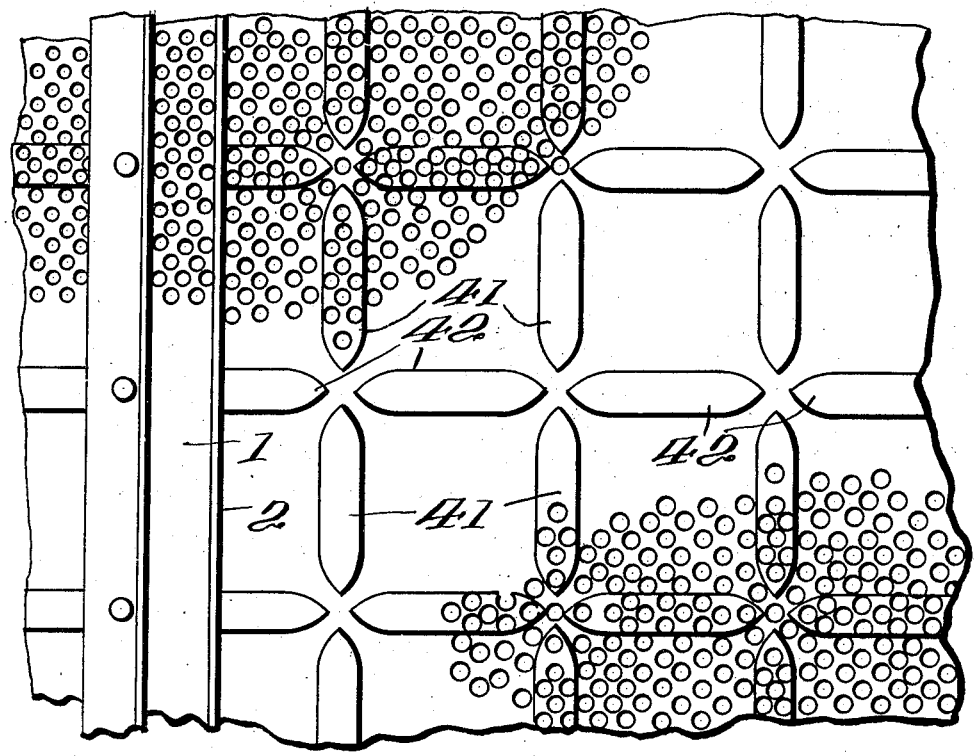
Fig. 16 is a top plan view showing a part of the roughened deck surface.

While our improvements are capable of being used for the separation of masses of different kinds of materials they are particularly adapted for the separation of the particles of the masses of coal, the said masses of coal ranging through the smaller sizes, for instance from one-sixteenth of an inch in size to one-one-hundredth of an inch. It is well known that all coal treated on the table shown in our said co-pending application, and treated on our type of table shown in various prior patents, is first screened into a number of sizes, and each size run over the table that is provided with the proper adjustments for that particular size of coal. The reason for this is that should the coal without being first sized be passed over our tables at one time the separation would naturally be very indifferent since the table is working on the principle of differences in specific gravity in the particles that form the mass. However with the best screening methods this condition exists to some extent, being due largely to the attrition of the particles. The present improvements will compensate however for the ordinary amount of under-sized particles that appear in the mass being separated. The Y-type of table has been working on a product of coal far in excess of these conditions, the products having the wide range in size hereinbefore referred to. This will be referred to hereinafter.

We refer to our mentioned co-pending application No. 530,357 which shows and describes the Y-type of table for a description of the general operation and it will not be repeated herein except as may be necessary for the understanding of the following improvements.

*General description.*

While our improvements herein described are capable of many variations, and of use with various forms of apparatus, we have shown them applied to a deck of a Y form. By reference to Figure 1 it will be observed that the table consists of a portion A which may be termed the stem of the Y, and the portions B which are the arms of the Y. Also that the riffles C which are on the stem A of the Y extend forwardly and inwardly in parallel relation, or substantially parallel relation to an unobstructed central portion 4. Where the stem joins with the arms B, and located in the line of the unobstructed part 4 is located a central rearwardly extending dividing member 32. Each of the arms B are provided with a plurality of riffles D that extend longitudinal of the Y, and preferably in parallel relation. Co-operating with the arms D are provided the banking bars E which may have gates F as here shown through which the heavier particles may pass off on to a suitable table G. In this plan view the tailings riffles 29 for the stem portion A and the arms B are provided, over which the material separated will flow and pass on to the bins H located at one side of the stem of the Y. Located at one side of the ends I of the stem portions D opposite the ends I of the stem portions D are suitable bins K into which the material may pass that has been separated. The material that passes on the table G will flow into bins L. Generally speaking in the apparatus a suitable pan M is provided on which the coal to be separated is dumped when it flows to a suitable pan N (shown by dotted lines Fig. 1) and then passes through the center opening P to the unobstructed part 4 of the deck. Means for reciprocating the table are shown at Q that is actuated by an electric or other motor R. It is unnecessary to describe further in detail the parts that have been above referred to since these are all clearly shown and described in our said co-pending application No. 530,357, and the pan N is described in our co-pending application No. 643,709.

*Improved air controlling strips.*

These air controlling strips are illustrated in Figures 5 to 12 and in Figure 13. Figures 5, 6, 7 and 11 are separated views of the combined riffles and air controlling strips that are applied to the top of the deck. It will be observed that they consist of L-shaped members in cross section and that these members are made up of perforated metal, both the vertical leg 1 and the horizontal leg 2 are therefore perforated throughout. These riffles are placed on top of each other as shown in Figure 13 and are fastened by being nailed or tacked through the horizontal portions into the longitudinal supports 3, the said nails not being shown. The vertical leg 1 of these perforated riffles is of the same height as the ordinary riffles, the said vertical wall being tapered towards the unobstructed portion 4 of the table, at which point the vertical wall substantially disappears. Attention is called to the fact that these riffles placed as shown form trough-shaped members or riffles located on top of the separating deck. It will be understood that these trough-shaped riffles may be used in connection with the form of deck shown in our co-pending application No. 530,357, or with the type of separating deck shown herein which will be specifically described hereinafter.

Heretofore these strips or riffles have at their horizontal portion been entirely flat, for instance as shown in our co-pending application. We have found by experience in the operation of the separating apparatus having the horizontal portions straight that small particles become wedged between these surfaces and the pervious deck and finally blind them completely rendering certain portions of the pervious table absolutely impervious to air, thus cutting off air to that portion of the deck. We have also found that the particles which produce this result pass through the pervious deck from the air chamber below and that these particles are carried by the fan when the air is obtained from an impure source. Therefore the porosity of the deck is much less in the regions covered by these strips owing to the over-lapping of the orifices in the cloth or metal forming the deck and they get wedged between the two surfaces. When this part of the deck becomes thus stopped up the operation of the deck is very materially affected and it becomes necessary to dislodge these particles, which has been found quite tedious and expensive. We in our present improvement avoid this blinding of the pervious deck by turning the front edges of the horizontal portion 1 slightly upward which allows the air to continually pass and carry away these little particles. The particles being so small it is only necessary to lift the edge 5 an infinitesimal amount, which is sufficient to allow the air to flow. In Figure 11 this lifting of the edge of the horizontal portion 5 has been very greatly exaggerated for the purpose of illustrating the idea.

Attention is directed to the fact that these trough-shaped riffles gradually decrease in height from their outer to their inner ends where the troughs substantially disappear at the unobstructed portion 4 of the deck. It will also be understood that these trough-shaped riffles are applied to the deck to extend longitudinally inward at an angle from opposite sides of the deck until they reach the unobstructed portion of the deck as shown in Figure 1. These controlling riffle troughs form porous troughs along the sides of the riffles and this part of the deck offers greater resistance to the air passing through it thus reducing the air pressure within the troughs, and this is true irrespective of whether the trough structures have less porosity than the deck itself.

For the purpose of further controlling the air pressure passing through the deck immediately back of the riffles we locate immediately under the deck a plurality of trough-shaped members 6, which are provided at one of their upper edges with laterally extending portions 7. These portions 7 rest on the supporting bars 3 and the deck 8 is located between the parts 7 and the horizontal portions 2 of the trough-like riffles above. In order to make these troughs 6 serve the purpose of retarding the flow of air it is essential that the ends 9 of these troughs be sealed. These ends abut against the vertical side 10 of the deck frame 11, which may be utilized for closing their ends. On the other hand the ends may be closed by filling them in by means of a piece of metal extending entirely across the end 9 of the troughs. This closure is shown by dotted lines 12, in Figure 11. If the porosity of the riffle troughs and of the troughs 6 were the same as the porosity of the deck it would cause friction of the air passing and serve to greatly reduce the air pressure at those points, but the air pressure can be further reduced by making the porosity of these riffle troughs and the troughs below less than the deck.

In screening fine sizes of material, especially upon a cheap product, accuracy in screening is practically impossible without incurring a prohibitive expense. As a result, if air pressure is adjusted for the coarser sized products, then there would be too much air for the finer ones, and these elements would be carried into the coarser tailings product as unseparated mass. By the use of these controlling troughs either above or below the deck, these particles encounter zones of less air pressure adjacent the riffles. The result is separation can take place in which the lighter and same class of particles can join their fellows, while the heavier elements remain in the pervious riffle troughs and report in the banking zone or zones with the larger of the mass.

In the construction of the troughs below the deck, any particles reaching the troughs will be propelled by the reciprocation of the table until they reach the ends which are left open so that these particles can be discharged into the air chamber where an attendant can remove them whenever desired. This does not constitute a product of separation, it being merely a mixture of all kinds of material and only amounts to a few ounces after weeks of continuous running. The riffle troughs which are located on top of the separating deck serve the same purpose in that the heavier particles reach the troughs and are propelled forward by the reciprocation of the table until they reach the unobstructed portion and finally the banking zone of the table.

*Raised ends of the separating deck.*

In Figure 13 is shown a perspective view of our improvement for increasing the efficiency of the apparatus. It will be observed that this improvement involves an additional elevation 13. This elevation preferably starts as shown in the above figure of the drawing a short distance back of the point above where the tailings riffle ends. We refer to this elevation as up-raise. From the drawing it will be observed that the side portions 14 of the arms of the Y are made higher than the deck, which constitutes an upraise, that some of the material must finally travel up. We find that this up-raise gives the table an extraordinary efficiency in making a clean refuse product from a promiscuous number of sizes of small coal in one operation. By means of this up-raise we are enabled to make a cleaner separation than has heretofore been accomplished. The operation of this up-raise is substantially as follows:

The material on the table just before it reaches this point consists of a mixture of relatively larger pieces of coal with relatively smaller pieces of slate or refuse of approximately the same weight. When these pieces encounter the up-raise, the finer slate particles climb this extra elevation at a faster ratio than the coal particles. This is due to the fact that coal has a cubical structure while the slate is of a flat structure. The center of gravity of the coal is higher above its base than is true of the flat slate. Consequently the coal keeps rolling backward while the slate is propelled forward and reports as refuse. This action is of course assisted by the banking feature of the table. Without the up-raise, the clean final separation would not be accomplished. It does not cost any more to make this clean separation since it is the same operation that makes the other separations, but it is the addition of this up-raise that accomplishes the function.

This up-raise when it is applied to a Y-shaped table is at each end of the Y as shown in Figure 13, but it can be applied also to other constructions of tables, for instance to the construction shown in Figure 3.

*Controlling air within the air chamber.*

It is well known to those skilled in the art that as in our patented structures, air is under a static pressure below the deck and within the air chamber for the purpose of producing an air cushion for floating the mass of material above, which enables the separation to be accomplished. Under these circumstances the pressure of air filtering through the deck surface, under normal loads of material, are approximately equal over its entire surface except in the zones adjacent or at the riffles. As a consequence in the prior art operating under the above stated conditions, the air maintains considerable velocity where it filters through the deck surface, but it loses its velocity a short distance above the deck surface by reason of its immediate expansion. That is to say, the air being under considerable static pressure below the deck, immediately loses its pressure when it has passed through the deck. Consequently we were obliged to use heretofore a deck surface of such porosity that very much less of the air would pass through it than the fan was furnishing. This enabled us to bank up considerable pressure within the chamber. At the same time it will be observed that there was a considerable limitation of the amount of air pressure immediately at the top of the deck. The conditions under which this class of separators operates especially when acting on masses of coal, is very different from when acting on masses of other material. In present commercial conditions the separating decks are required to carry heavier beds of material than the old type of air cushion would properly support. We effected some modification of the foregoing in connection with our co-pending application 530,357 in certain areas of the table by a system of lipped baffles that direct the air to the desired areas. However this is operative only within certain limits, especially as we carried within the air chamber of this table considerable static pressure.

Our present improvement is to provide in the air chamber an adjustable lip plate or plates which control the air flowing to the deck, which is of such porosity that it will admit air through it with nearly the same capacity as it is produced by the fan. We control the flow of air to the deck by the baffle plate below it and at the same time by providing the lipped baffle we control the air pressure through the deck surface. This air pressure through the deck is in direct proportion to the thickness of the bed of material being acted upon and robs the deck surface of air where the bed is thinnest down to a sufficient amount of air that will just float the material in those areas, and effect proper separation. The improvements for controlling the air within the air chamber 15 that flows to the deck 20 above comprises a baffle plate 21 that is furnished with a plurality of inclined lips 22. These lips incline in a direction opposite to the flow of the material on the deck. Below the adjustable plate 21 is a similar plate 21', which is located in the lower portion of the air chamber 15. The rear end 23 of the baffle plate 21 is suitably hinge supported as at 24, the said hinge fitting loosely in the wall of the deck frame 11 as shown at 25, whereby it may be moved as conditions require. The front end of this baffle plate has attached to it a slotted metallic member 26, which straddles a bolt 27. By means of this construction the baffle plate 22 may be moved towards and away from the deck 20, the said movement being greater at its front end than it is at its rear hinged end. It will be noted that the upper baffle plate is substantially immediately below the deck supporting ribs 28. Attention is directed to the fact that the lips on the two baffle plates 22 and 22' extend in the same general direction, viz. in the direction opposed to the movement of the material on the deck that is being separated. By reference to Figure 20 it will be noted that the lips extend in the same general direction up to the point XY, at which point they extend directly up under the feed of the deck.

Particular attention is called to the fact that these baffles plates are so constructed as to provide a progressive amount of air opening, whereby the air is progressively allowed to pass through the said plate. It will also be observed that the plate 21 is provided around its edges with an imperforate portion 29. The lips 22 of the plate 21 are almost closed immediately under the banking zone, and they open progressively towards the tailings discharge side of the table 29 (Fig. 19) and towards the feed end 30 (Fig. 18) while those above the line XY have their lips almost full open. We desire it to be understood that these adjustments are varied within wide limits to meet the various conditions of operating upon various masses of coal or other material. However this scheme of progressive openings towards the tailings discharge sides and the feed is adhered to, since the bed of material is thicker in those regions. The object of having the blank imperforate portion 29 which is located immediately under the tailings discharge side of the table is to slightly reduce the air pressure at these zones where the material passes immediately over the tailings riffle.

We wish to call attention to the fact that the action of the lips of the baffle is cumulative, that is the forward pressure of air by one row of lips is added to those in advance of them in the direction already indicated, until there is produced immediately under the feed the greatest amount of volume of air under pressure passing through the deck surface. The important features to work in connection with these baffles is that the deck surface must be sufficiently open in porosity to allow the escape of air with almost the same freedom as the amount of intake of air of the fan.

Attention is directed to the operation of this plate in that it is placed up close against the deck supporting ribs 28, and that the inclined lips in pushing air forward starves the air from a portion of the deck, preferably leaving only enough to filter between the deck supporting ribs as will just float the mass at this point, where it consists of the heavier particles. In this connection we desire to say that the lips of the lower baffle 22' are turned preferably in the same direction as the upper one.

By saying that the deck surface has a greater porosity than our older type of tables, it must not be inferred that some of the particles of the mass being treated will pass through into the air chamber. In fact all of the products being separated are discharged from the deck surface and report at various points as heretofore. In Figure 20 it will be observed that the direction of air pressure is distributed over the deck surface in the reverse direction from that shown in our co-pending application No. 530,357.

*Pneumatic skimmers.*

This part of the invention is for delivering a cross draught of air at an angle to the reciprocation of the table. Heretofore we have utilized a draught of air upon the material as it approaches the banking zone, for instance as in our co-pending application 530,357. In our said application however the draught of air is so fed as to cause a downward pressure on the material. This downward pressure in part overcomes the supporting effect of the air cushion and thereby causes the material to lie dead along this path and not to travel on the deck surface as freely as the rest of the material. This is overcome in our present improvement.

Referring to Figures 14 and 15 in which 31 is the banking bar or the central deck rib 32 in proximity to which we support what may be aptly termed a skimmer 33. This skimmer as here shown is angular in cross section and has at its lower front edge an air opening 34 through which air passes from it in a direction substantially horizontal across the bed of material on the separating deck 20. Air for this skimmer is provided through a pipe connection 35 that has its lower end 36 communicating with the air chamber 15. Air from the chamber 15 passes through the pipe 35 to the interior of the skimmer and from the skimmer through an opening which is preferably an elongated slot 34 which is located at its lower edge. This skimmer is adjustable by means of the upwardly extending slotted arm 37 and a thumb nut 38 which passes through the arm 37 and a cross support 38. The skimmer 33 is capable of adjustment by reason of the telescopic portions 39 and 40 of the pipe and by means of the slotted member 37 and the thumb nut 38. This adjustment enables the skimmer 33 to be moved up or down or turned outward so that the air passing through the opening 34 may be elevated, or be turned upward at an angle to the material being separated according to the character of the material being acted upon, which is controlled by the desired result. The air flow is controlled by a gate 39'.

It will be observed that this skimmer overcomes the objection to the cross current construction of our said co-pending application in that it does not provide a downward pressure on the material having the affect of stifling its movement, which it will be observed is of considerable import.

*Roughening deck surface.*

In our said co-pending application the improvements for roughening the deck surface to cause a better hold on the heavier materials is accomplished by providing a large mesh wire. While this construction is perfectly operative for most materials it has an objection when treating coal, for the reason that the flat pieces of slate become wedged between the said wire and the deck surface, which causes a blinding affect. In our present improvement the deck surface is made of foraminous material, the configuration of the surface, as well as the riffles being stamped in the perforated material by suitable dies. This obviates the necessity of using coarse wire and produces a surface that provides projections 41 and 42 which provide ample roughening of the surface to accomplish the movement of the heavier particles while obviating the necessity of using a coarse wire. This deck therefore may be made of perforated material which can be found on the market and stamped to the construction shown in Figures 16 and 17. This improved deck has the advantage over the wire structure that has been explained as well as furnishing a much rougher surface that causes the heavier materials to move more readily over the deck thus increasing the amount of separation accomplished, which greatly increases the efficiency of the apparatus. It also serves to loosen up the said heavier particles causing the lighter material to readily be lifted by the air pressure and afterwards separated in the manner that is explained in our copending application.

Referring to the air retarding strips, ordinarily when the upper strips are used, the lower ones are not used, and when the lower ones are in use then the upper ones are not utilized.

Figure 17:
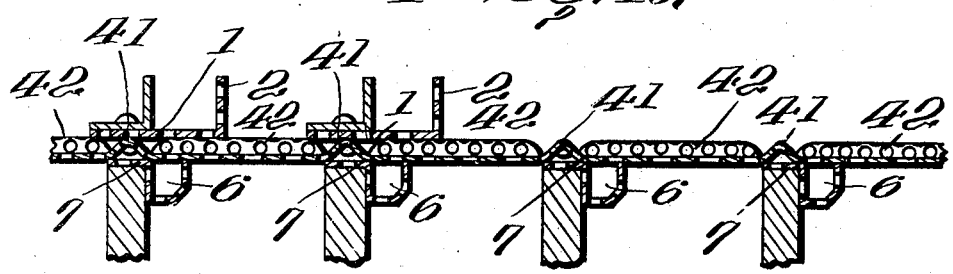
Fig. 17 is a vertical cross sectional view of a part of Fig. 16.

Ordinarily when the upper retarding strips are used, the deck covering is made of textile material. However, when the lower air retarding strips are used, then usually the deck covering is made of perforated metal 41', either plain or corrugated, as shown in Fig. 21. Both devices are used together only in extreme cases, and their joint use is shown in Figs. 13 and 17.

While we have explained in detail the construction of the foregoing improvements, we wish it understood that we do not limit ourselves to these details and that our invention is of a breadth that is measured by a fair interpretation of the appended claims.

Having thus described our invention what we claim and desire to secure by Letters Patent is:—

1. The method of dry separation of the elements of a mass, which consists in subjecting the mass to reciprocation on an air cushion for causing separation of its elements, and finally subjecting the remaining unseparated elements to a relatively short sudden upward reciprocation thereby effecting further separation of the unseparated elements.

2. The method of dry separation of the elements of a mass, which consists in subjecting the mass to reciprocation on an air cushion for causing separation of its elements, and finally separating the remaining unseparated elements by subjecting them to a relatively short sudden upward reciprocation, thereby effecting further separation of the unseparated elements.

3. The method of dry separation of the elements of a mass, the mass composed of cubical and flat elements, which consists in subjecting the mass to reciprocation on an air cushion for causing separation of its elements, and subjecting the remaining unseparated flat and substantially cubical remaining unseparated elements to a relatively short sudden upward reciprocation, whereby the flat elements are transmitted upward by the reciprocation and the cubical elements roll backward for the purpose of causing separation of said elements.

4. The method of dry separation of the elements of a mass which consists in subjecting the mass to reciprocation on an air cushion for causing separation of its elements and subjecting the heavier elements of the mass to a banking affect, and subjecting the mass substantially at the banking zone to a skimming draft of air for the purpose of better effecting separation of its elements.

5. The method of dry separation of elements of a mass which consists in subjecting the mass to reciprocation on air cushion for causing separation of its elements, and providing a banking zone for its heavier elements, and subjecting the mass to a substantially horizontal draft of air located substantially above the mass for the purpose of effecting a better separation of its elements.

6. An apparatus for dry separation of the elements comprising a deck having a primary separation and at its delivery end a banking element, and the delivery end just in advance of the banking element having a relatively short sudden upraise for the purpose of increasing the final separation of said elements.

7. An apparatus for dry separation of the elements of a mass comprising a substantially Y-shaped table, the arms of the Y having at their delivery edge a relatively short sudden upraise for the purpose of subjecting the material delivered thereto to a final separation.

8. An apparatus for the dry separation of the elements of a mass comprising a substantially Y-shaped table having substantially a central unobstructed portion, a banking zone located at the delivery end of the arms of the Y, and the arms of the Y having a relatively short sudden upraise located just back of the banking zone, for the purpose described.

9. An improved deck for the dry separation of the elements of a mass comprising a portion extending substantially longitudinally of the reciprocation of the deck, the delivery end of said portion having an angular extending part to effect final separation, and a longitudinally extending division arm located at the junction of the longitudinal and angular portion, said division arm provided with an air supply feeding air in a direction substantially transverse the reciprocation of the deck in advance of said final separation 10. A separating deck comprising a substantially Y-shaped deck, the stem of the deck having a substantially unobstructed central portion with a longitudinally extending member located substantially central between the arms of the Y, said arms making a final separation and an air feeding device located at opposite sides of said arm and feeding an air draft in substantially opposite directions transverse the stem of the deck in advance of said final separation.

11. An improved dry separating apparatus comprising substantially a deck having a longitudinal portion and an angular portion, said angular portion provided with a banking zone, and an air feeding device located at the banking zone constructed to feed a blast of air substantially in a horizontal direction, for the purpose described.

12. An apparatus for dry separation of the elements of a mass comprising a substantially Y-shaped deck having a banking zone located at the delivery side of the arms of the deck, and an air feeding device located at the banking zone having a substantially horizontal slot for feeding air substantially horizontally to the mass, for the purpose described.

13. An apparatus for dry separation of the elements of a mass comprising substantially a Y-shaped deck provided with a banking zone located at the delivery side of the arms of the Y, and an air feeding device located at the banking zone having a horizontal slot located substantially above the mass and feeding air substantially above the said mass to provide a skimming air draft, for the purpose specified.

14. An improved deck for the dry separation of the elements of a mass, said deck having a banking zone, and an air feeding device located at the banking zone and having a horizontal outlet slot located substantially above the mass and feeding air longitudinally substantially over the mass, for the purpose specified.

15. An apparatus for the dry separation of a mass comprising a previous deck having an air cushion arrangement, said deck having riffles with a longitudinal portion extending toward the end thereof, the longitudinal edge of the riffle slightly lifted for the purpose of preventing a blinding of the pervious deck.

16. An improved apparatus for the dry separation of elements, comprising a pervious deck having riffles placed on top of the deck and through-like members located under the said deck for the purpose of receiving and conveying certain elements beneath the said deck.

17. An apparatus for the dry separation of elements of a mass, comprising a pervious deck having located on top of the deck a plurality of riffles, and located under the deck substantially at the riffles trough-shaped members extending beneath the table for catching certain elements and delivering them below the said deck.

18. An improved dry separating apparatus, comprising a pervious deck, an air chamber below the said deck, a plurality of riffles on top of the deck and a plurality of pervious U-shaped members located substantially under the riffles, for the purpose described.

19. An improved apparatus for the dry separation of the elements of a mass comprising a pervious deck, an air chamber beneath the deck, substantially trough-shaped riffles on top of the deck, and trough-shaped members below the deck and below said riffles, the parts operating as described.

20. An improved apparatus for the separation of the elements of a mass, comprising a pervious deck having an air chamber below it, substantially trough-shaped pervious riffles located above the deck, and substantially trough-shaped members located under the deck and under the said riffles, the parts operating for the purpose described.

21. An improved apparatus for the separation of the elements of a mass, comprising a pervious deck, an air chamber below the said deck, pervious trough-shaped riffles above the deck, the said troughs decreasing from their outer to the inner ends, and pervious trough-shaped members located under the said riffles, the parts operating for the purpose described.

22. An improved separating deck for the elements of a mass, comprising a pervious deck, an air chamber below the deck, trough-shaped riffles above the deck reduced in height from their outer to their inner ends, and pervious trough-shaped members under the riffles, said members having closed outer ends, for the purpose described.

23. An improved apparatus for dry separation of the elements of a mass comprising a pervious deck provided with riffles, an air chamber below the deck, pervious trough-shaped members above the deck and reduced in height from their outer to their inner ends, and pervious trough-shaped members under the deck and the said riffles, said latter trough-shaped member made substantially U-shaped at its outer end and gradually decreasing to a V-shape.

24. An apparatus for the dry separation of elements of a mass, comprising a pervious deck forming an air cushion, said deck having a primary separation and a final separation including a banking element located at the delivery end of the deck, said delivery end of the deck having a relatively short sudden upraise located in front of the banking element and at the delivery end of the table for the purpose specified.

25. An apparatus for the dry separation of elements of a mass, comprising a deck having a primary separation and a final separation located at its delivery end provided with a banking element, and the delivery end having a relatively short sudden upraise located in front of the said banking element, said upraise extending transverse the reciprocation of the table, whereby the elements are subjected to a final separation just before delivery.

26. An apparatus for the dry separation of elements of a mass comprising an elongated table having an elongated pervious deck forming an air cushion for the mass, means for reciprocating the table longitudinally, said deck provided with a primary separating means, and a final separation consisting of a banking element located at the delivery end of the table, the delivery end of the table having a relatively short sudden upraise located in advance of the banking element and extending in a direction across the reciprocation of the table, the parts constructed to operate for the purpose described.

27. An apparatus for the dry separation of elements of a mass, comprising a pervious deck, an air chamber beneath the said deck, and a baffle plate located below the said deck having an imperforate portion around the main portion of the deck to cut off the amount of air passing to the deck above the imperforate portion, for the purpose specified.

28. An apparatus for the dry separation of elements of a mass, comprising a pervious Y-shaped deck, an air-chamber beneath the said deck, a baffle plate in the said chamber located beneath the said deck and the Y-arms, the baffle plate being imperforate around the outer main body of the deck and the said arms of the Y, for the purpose of limiting the flow of air around the said edges.

29. An apparatus for the dry separation of the elements of a mass, comprising a pervious Y-shaped deck, an air-chamber beneath the said deck and said arms, and a Y-shaped baffle plate in the said chamber beneath the deck, the said baffle plate having an imperforate portion around the outer edges of the main body of the table and the said arms, said baffle plate being relatively adjustable in respect to the said deck, for the purpose specified.

In testimony whereof we hereunto affix our signatures.

HENRY MOORE SUTTON.
WALTER LIVINGSTON STEELE.
EDWIN GOODWIN STEELE.